United States Patent [19]

Cini

[11] 3,743,457
[45] July 3, 1973

[54] STOCK FLOW CONTROL MEANS FOR EXTRUDERS AND THE LIKE

[75] Inventor: Adrian V. Cini, Levittown, Pa.

[73] Assignee: Acme-Hamilton Manufacturing Corporation, Trenton, N.J.

[22] Filed: July 13, 1971

[21] Appl. No.: 162,151

[52] U.S. Cl.............. 425/113, 425/110, 425/131, 425/133, 425/376
[51] Int. Cl............................................. B29f 3/10
[58] Field of Search.................... 425/109, 145, 369, 425/370, 110, 135, 376, 377, 378, 379, 380, 381, 113, 131, 132

[56] References Cited
UNITED STATES PATENTS

| | | |
|---|---|---|
| 3,280,430 | 10/1966 | Antrobus............................ 425/370 |
| 3,388,425 | 6/1968 | Detter................................. 425/112 |
| 3,430,292 | 3/1969 | Bauman et al..................... 425/185 X |
| 3,605,190 | 9/1971 | Christy............................... 425/113 |
| 3,677,676 | 7/1972 | Hegler................................ 425/109 |

Primary Examiner—J. Spencer Overholser
Assistant Examiner—Brian P. Ross
Attorney—Samuel Ostrolenk et al.

[57] ABSTRACT

A control assembly for extruders and the like in which stock is fed to the extruder at a substantially constant rate, passing through the outlet end into die members to form the plastic product defined by the mold members. The extruder head is provided with an additional outlet port for forming a skim along the interior surface of the product being formed which requires a cut-off of stock flow at periodic intervals. Rotatable means are provided for selectively diverting a portion of the main stock flow to be introduced into an opening within an extrusion die member so as to be diverted therethrough and passed through a central opening which communicates with an associated outlet opening provided in the extruder die head to form the skim layer. The control means comprises an axially rotatable plug member which, in a first angular position, provides for cut-off of the central stock flow while in a second position permits the main stock flow to be diverted therethrough and to enter into the extruder central opening. The control means, which is preferably a piston-driven structure, is loosely linked to the plug means so as to prevent any jarring or misalignment of the plug member while at the same time providing rapid and positive on/off action of the control means.

10 Claims, 25 Drawing Figures

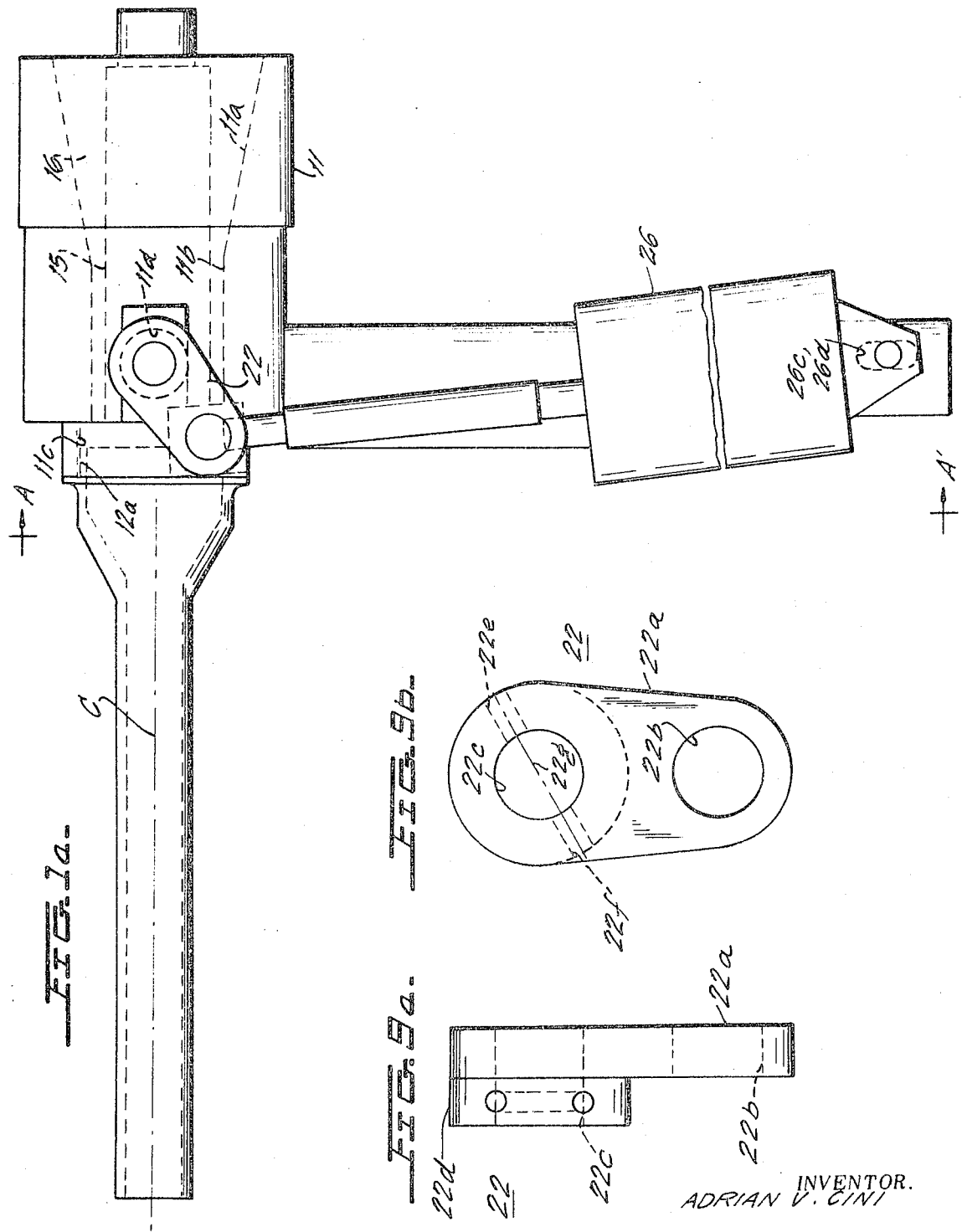

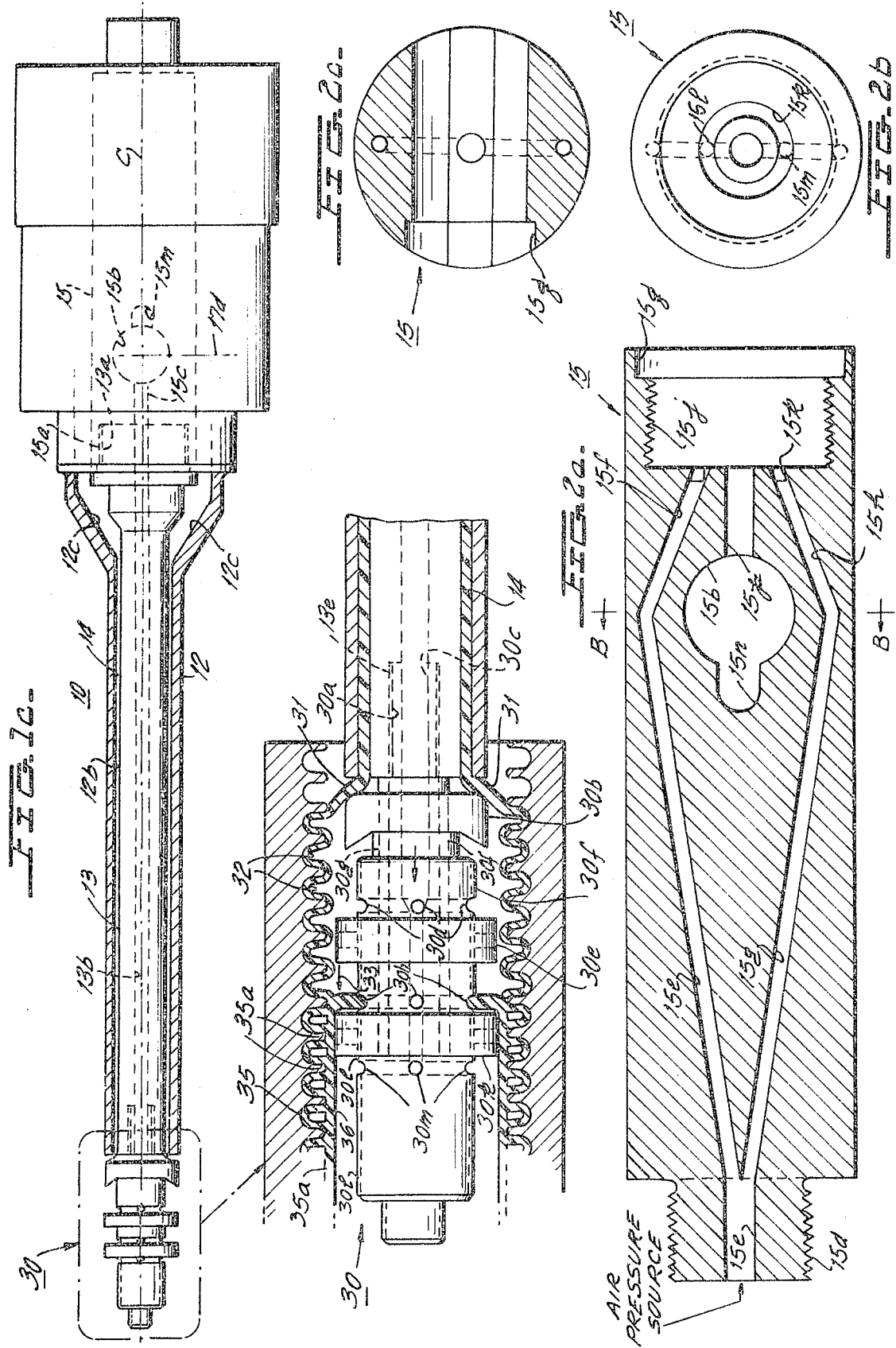

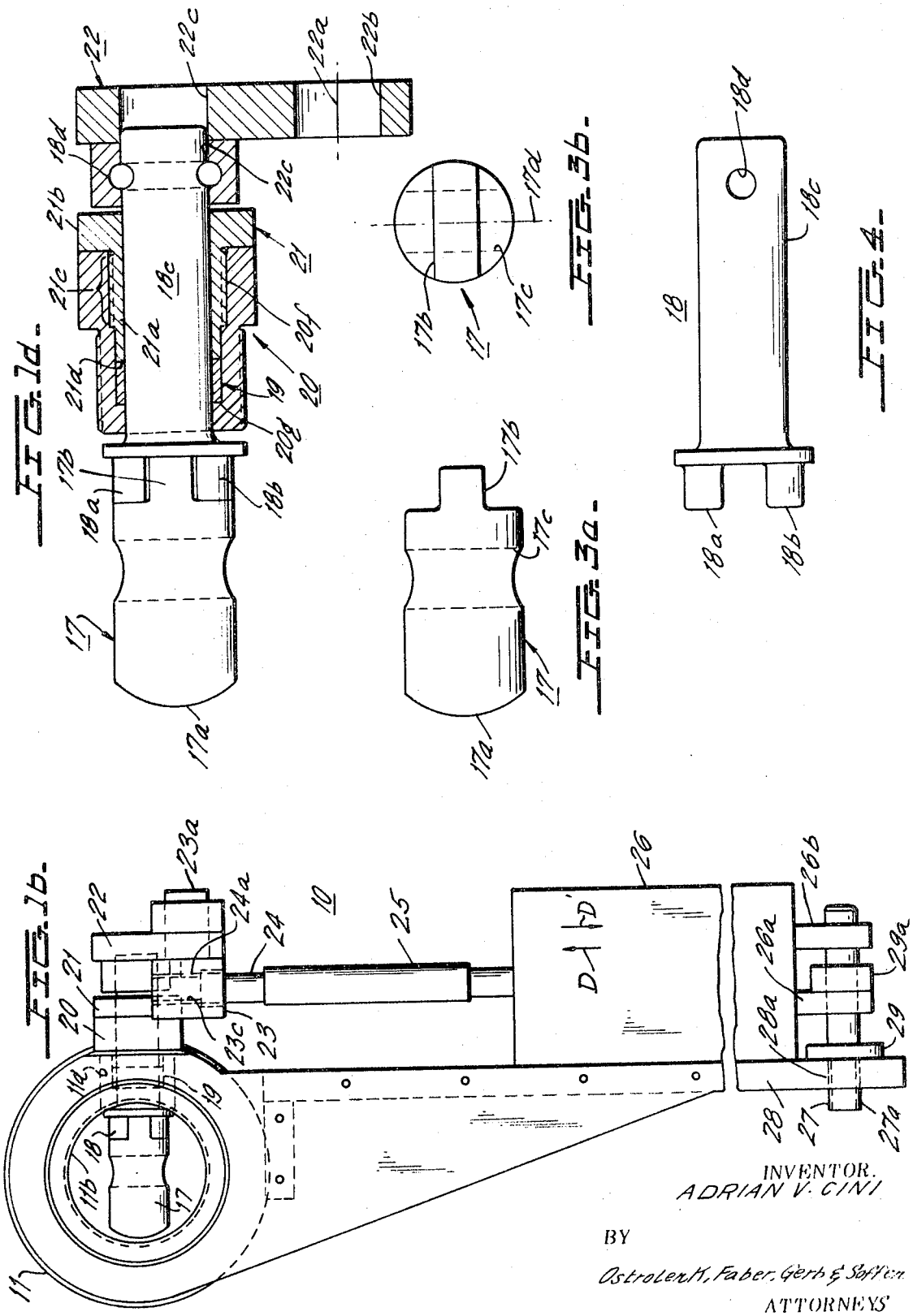

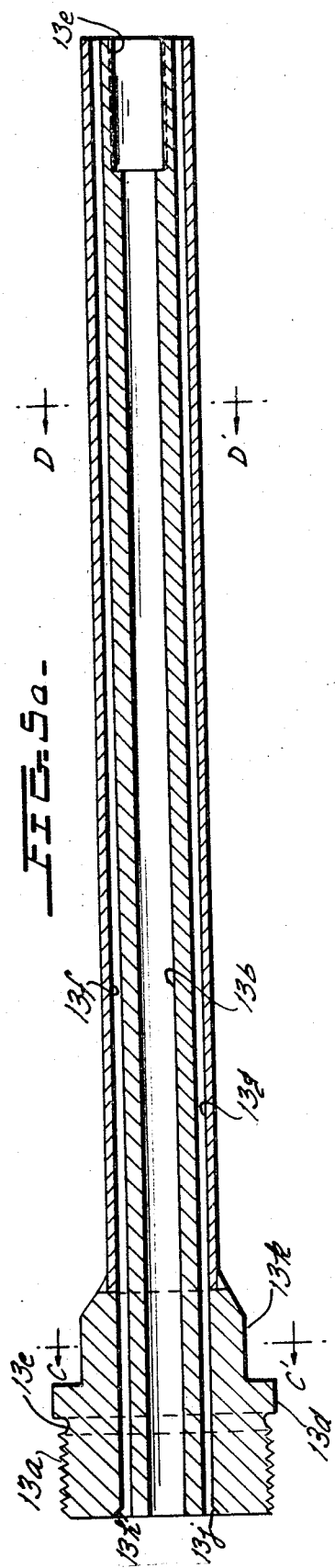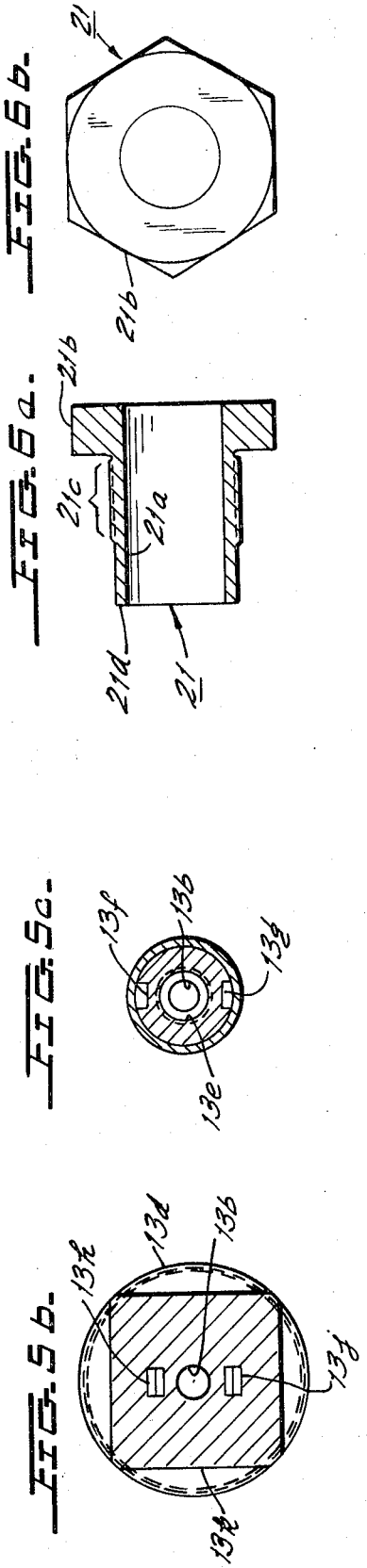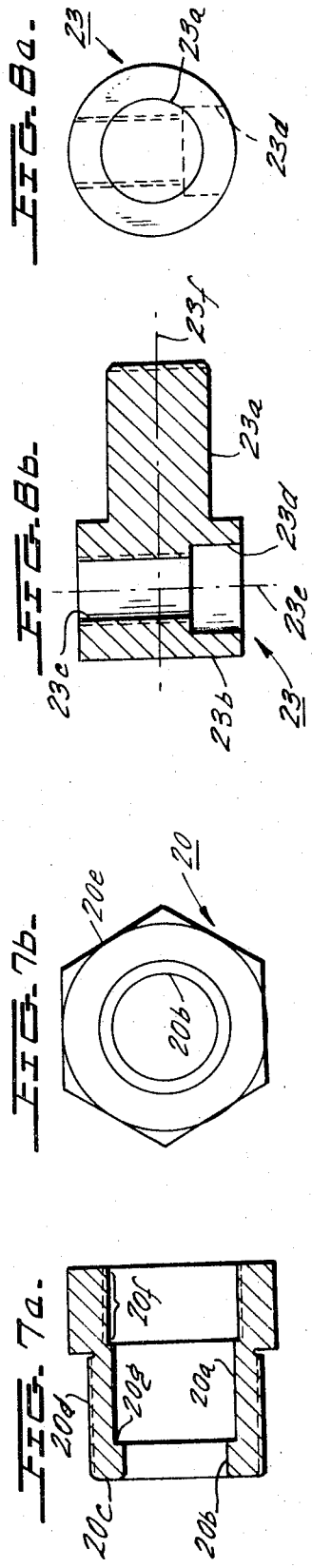

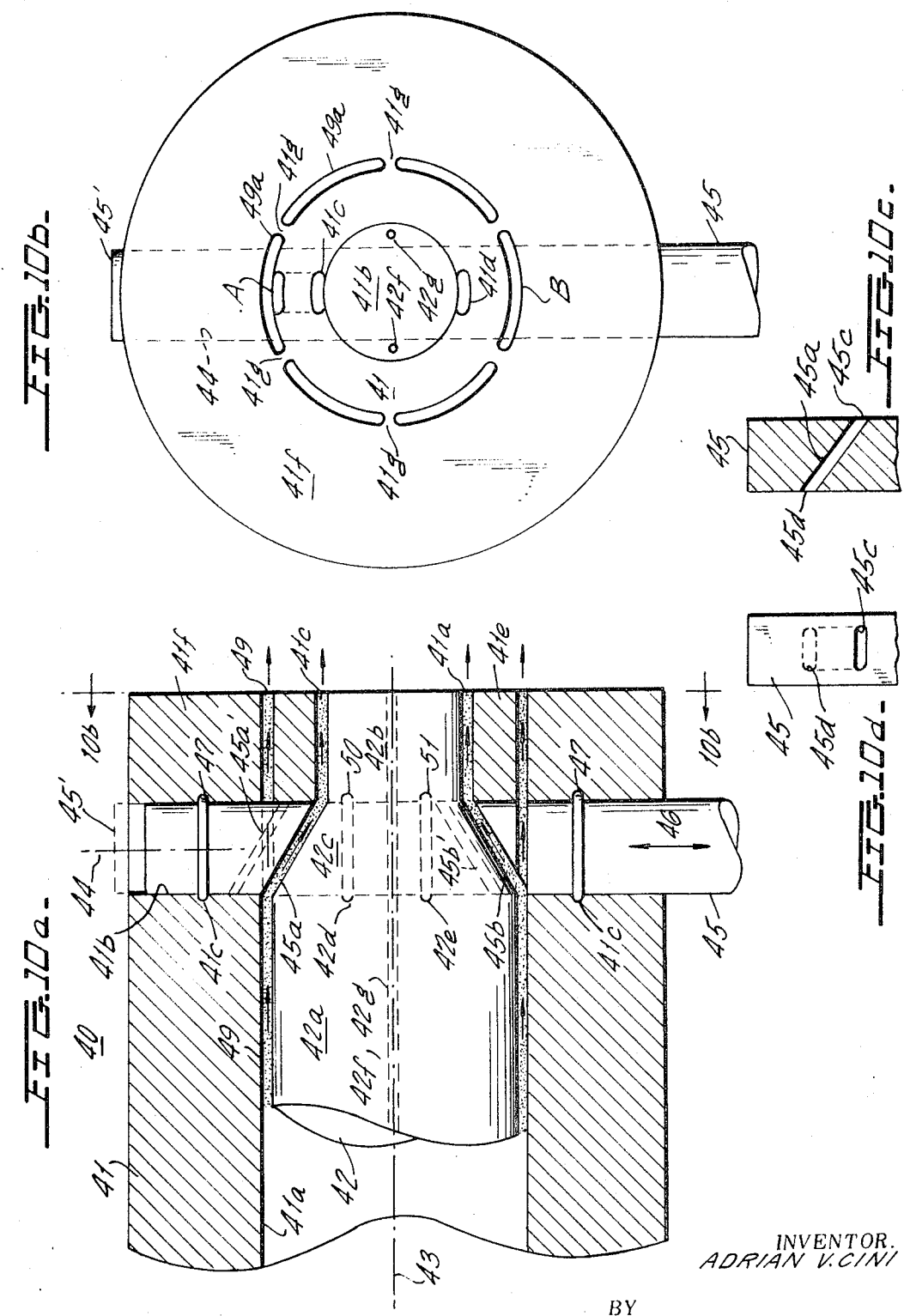

STOCK FLOW CONTROL MEANS FOR EXTRUDERS AND THE LIKE

BACKGROUND OF THE INVENTION

This invention relates to extruder mechanisms and more particularly to a novel control means for controlling the flow of stock in extruder mechanisms so as to provide at least one intermittent stock flow within the extruder assembly which is extremely advantageous for use in forming corrugated tubing and the like.

Corrugated tubing finds widespread use throughout a variety of industrial commercial and home applications. Typical corrugated tubing is comprised of an elongated corrugated section usually provided with a smooth cylindrical shaped cuff at each end thereof for connection with peripheral components. As one example, such corrugated tubing may have one cuff coupled to the vacuum port of a vacuum cleaner with the cuff at the opposite end being employed to couple vacuum cleaner accessories thereto such as, for example, brushes, nozzles and the like.

U.S. Pat. No. 3,280,430, issued Oct. 25, 1966 to Antrobus and assigned to the assignee of the present invention describes an advantageous method and apparatus for producing corrugated tubing which, briefly, is comprised of consecutively forming two cuff sections for two separate but connected sections of corrugated tubing, then forming a corrugated section of desired length. Thereafter, the same pattern is continuously repeated. After the product is completed the corrugated tubes are separated from one another by cutting at a point between the two adjacent cuff sections which have been formed thereby separating each corrugated tube from the next. This technique and the apparatus associated therewith is set forth in detail in the above identified patent which is incorporated herein by reference thereto.

As further described in the above mentioned patent, it is advantageous in certain instances to provide a thin skin or interlayer within the interior of the corrugated tubing so as to provide a relatively smooth interior surface while at the same time retaining the resiliency and flexibility of the corrugated tube. In order to form the skim portion, the extruder assembly is provided with an additional outlet opening through which stock is emitted to form the skim along the interior peaks of the corrugated tubing. In forming corrugated tubing through the utilization of the apparatus described in the above mentioned patent, it becomes necessary to terminate the flow of stock during those intervals in which adjacent cuff portions are being formed. To date, no suitable technique has been developed prior to the advent of the present invention.

BRIEF DESCRIPTION OF THE INVENTION

The present invention is comprised of an extruder assembly having an input end for receiving stock which is fed thereto in a substantially continuous flow. The stock is fed along an elongated annular shaped hollow region where it is emitted at the outlet end and is guided around an annular member so as to enter into the depressions of the die mold members. Air passes through a conduit provided within the interior of the extruder assembly and subsequently passes through openings in a die head assembly to facilitate the filling of the die mold depressions with stock.

The main stock flow may be selectively diverted through an opening provided in a stationary die member, which opening is aligned transverse with the longitudinal axis of the extruder assembly. A cylindrical-shaped plug means is inserted within the opening and, when rotated about its longitudinal axis to a first position, allows the stock to pass therethrough so as to enter into an axially aligned central opening where it passes through the extruder assembly to the outlet end at which point the stock passes about an annular shaped guide member so as to form the skim referred to hereinabove.

By rotation of the plug member to a second position, the otherwise diverted stock flow is blocked from entering into the centrally located elongated opening so as to prevent the forming of the skim either in cases where corrugated tubing with no skim is to be formed or during those intervals in which the cuff portions of the corrugated tubing are being formed. The plug member, while being very accurately fixed within the aforementioned transversely aligned opening, is loosely fitted to a coupling stem which provides sufficient play between the plug and stem members so as to prevent any damage or misalignment of the plug member during operation. A piston drive means is utilized for providing the rotational actuation of the stock flow control means.

In an alternative embodiment, the axially rotatable plug means may be replaced by a linearly reciprocating plug member which operates in a similar fashion.

The extruder and control means may be advantageously employed for forming corrugated tubing with an internal skim wherein the extruder means is further provided with a conduit for introducing pressure into the die members to facilitate even distribution of the emitted stock against the undulations of the die members.

It is therefore one object of the present invention to provide a novel stock flow control means for use in extruder assemblies and the like in which at least one particular stock flow conduit may be selectively operated so as to either enable or interrupt stock flow therethrough.

Another object of the present invention is to provide a novel flow control mechanism for use with extruders and the like employed to form corrugated tubing in which the control mechanism intermittently interrupts one stock flow conduit to selectively control the forming of the skim within the interior surface of the corrugated tubing being formed.

Still another object of the present invention is to provide a novel coupling mechanism for use with a stock flow control means in which sufficient play is provided between the plug means and its associated stem member so as to prevent any misalignment of the plug means even after long and continuous operation thereof.

BRIEF DESCRIPTION OF THE FIGURES

These as well as other objects of the present invention will become apparent when reading the accompanying description and drawings in which:

FIG. 1a is a top plan view of an extruder assembly designed in accordance with the principles of the present invention.

FIG. 1b is an elevational view of the assembly of FIG. 1a looking in the direction of arrows A—A'.

FIG. 1c is a top view, partially sectionalized, showing the extruder assembly portion of the apparatus of FIG. 1a.

FIG. 1d is an assembly drawing showing the detailed relationship of the manner in which the members of FIGS. 3, 4, 6, 7 and 9 are cooperatively assembled.

FIG. 2a is a sectional view of the stationary male extrusion die member of FIG. 1c.

FIG. 2b is an end view of the right-hand end of the die member shown in FIG. 2a.

FIG. 2c is a sectional view of the die member of FIG. 2a looking in the direction of arrows B—B'.

FIGS. 3a and 3b are side and end views, respectively, of the plug member of FIG. 1b.

FIG. 4 is a side view of the stem member of FIG. 1b.

FIG. 5a is a sectional view of the extrusion pin member shown in FIG. 1c.

FIG. 5b is a sectional view of the member of FIG. 5a looking in the direction of arrows C—C'.

FIG. 5c is a sectional view of the member of FIG. 5a looking in the direction of arrows D—D'.

FIGS. 6a and 6b are side and end views, respectively, of the bushing seal shown in FIG. 1b.

FIGS. 7a and 7b are side and end views respectively of the valve stem bushing of FIG. 1b.

FIGS. 8a and 8b are top plan and sectional views, respectively of the air cylinder pivot clevis of FIG. 1b.

FIGS. 9a and 9b are side and top views, respectively, of the stem rotating arm of FIGS. 1a–1d.

FIGS. 10a and 10b are sectional and end views, respectively, showing another preferred embodiment of the present invention.

FIGS. 10c and 10d are sectional and elevational views, respectively, showing a portion of the plunger of FIGS. 10a and 10b in greater detail.

DETAILED DESCRIPTION OF THE FIGURES

FIGS. 1a–1c show the extruder assembly 10 of the present invention which is comprised of a female extrusion die member 11 having a central opening running through the length of the member 11. The right-hand end is coupled to means for feeding stock flow thereto and the opening consists of a tapered portion 11a which narrows to a smaller diameter opening 11b which extends through to the forward or left-hand end of the member relative to FIG. 1a. The left-hand end of female die member 11 is provided with a tapped opening 11c which threadedly engages the threaded right-hand end of a removable die member 12 having an associated threaded portion 12a. As can best be seen from FIGS. 1a and 1c, extrusion die member 12 has a hollow interior 12b of constant diameter running from its left-hand end toward its right-hand end which hollow central opening communicates with a portion 12c of enlarged diameter, which enlarged diameter section widens to an inner diameter substantially equal to the constant diameter portion 11b of the opening in die member 11. Fitted into the interior of extrusion die member 12 is an elongated extrusion pin member 13, to be more fully described in detail in conjunction with FIGS. 5a–5c. Elongated pin member 13 is aligned so as to be concentric with die member 12 so as to form an elongated annular-shaped hollow interior portion 14 between the exterior surface of member 13 and the interior surface of member 12. The right-hand end of elongated pin member 13 (relative to FIG. 1c) is provided with a threaded portion 13a which threadedly engages the tapped portion 15a of a male extrusion die member 15, to be more fully described in detail in conjunction with FIGS. 2a–2c. Member 15 is positioned within the opening 11a–11b of die member 11 so as to be concentric therewith and so as to form an annular-shaped hollow region 16 between the exterior surface of die member 15 and the interior surfaces of openings 11a and 11b of die member 11. Die member 11 is provided with an opening 11d which is aligned so as to be perpendicular to the longitudinal axis C of the assembly 10. A similar opening 15b aligned with opening 11d is provided within male extrusion die member 15 as shown best in FIG. 1c. This opening receives an axially rotatable plug member 17 to be more fully described in conjunction with FIGS. 1c, 1d, 3a and 3b. As will be more fully described in connection with the operation of the stock flow control mechanism, plug member 17 rotates about its longitudinal axis under the control of a piston drive means (to be more fully described) to control the flow of stock downwardly (and upwardly) through opening 15b in male extrusion die member 15 and through an axial opening 15c provided in member 15 which communicates with a central opening 13b provided in elongated pin member 13 so as to selectively feed stock therethrough, which stock is emitted from the outlet end of the apparatus for use in a manner to be more fully described. By rotation of plug member 17 to a second position, this stock flow may be halted when desired.

The right-hand end of plug member 17 is loosely mechanically linked to a stem member 18 to be more fully described in conjunction with FIGS. 1d and 4, which member couples the rotation imparted to member 18 through the piston drive means (to be more fully described) to plug member 17. The right-hand end of stem member 18 passes through a hollow ring 19, a bushing 20 and a bushing seal 21 (to be more fully described in connection with FIGS. 1d and 6a–7b) and has its right-hand end linked to a stem rotating arm 22 to be more fully described in connection with FIGS. 9a and 9b. This linkage, as will be described, is by means of a pin which is fitted through an opening provided in stem 18 and passes through a pair of cooperating openings provided in the stem rotating arm 22. The opposite end of stem rotating arm 22 receives one end 23a of an air cylinder pivot clevis 23 which is provided with an opening 23c for threadedly engaging the free end 24 of a piston shaft which is coupled through a piston shaft adapter 25 to an air cylinder 26. The lower end of air cylinder 26 (relative to FIGS. 1a and 1b) is prevented from experiencing any significant linear movement by means of pivot pin 27 which threadedly engages an opening 28a provided within the air cylinder pivot plate 28. Opening 28a is tapped so as to threadedly engage the threaded portion 27a of pin 27. A lock nut 29 is utilized to rigidly secure pin 27 to pivot plate 28. The lower end of air cylinder 26 is provided with a pair of projections 26a and 26b, each of these projections having elongated openings 26c, 26d (shown best in FIG. 1a) for receiving pin 27. As can clearly be seen from FIG. 1a, the openings 26c and 26d provide for some limited linear movement of the piston member relative to pivot pin 27 to assure proper alignment and operation of plug 17. Collar 29 is provided for locking the air cylinder in position relative to pivot pin 27.

FIGS. 2a–2c show the stationary male extrusion die 15 of FIG. 1c in greater detail. The left-hand end of member 15 is provided with a threaded portion 15d which is fitted to an appropriate coupling (not shown) for connecting male die 15 to an air pressure source. The central portion of threaded projection 15d is provided with an opening 15e which couples the incoming air pressure in common to a pair of conduits each having diagonally aligned conduit portions 15e–15f and 15g–15h. The right-hand ends of conduit portions 15f and 15h communicate with aligned openings in elongated pin member 13, as will be more fully described. The diagonally aligned paths formed by the conduits are provided so as to carry the air through die 15 without interfering with opening 15b.

The right-hand end of die 15 is provided with a recessed portion which is tapped at 15j so as to be threadedly engageable with a threaded portion provided at the communicating end of elongated pin 13, as will be more fully described. A circular-shaped groove 15k is provided in the base of the recess and is designed to communicate the air passing through conduits 15e–15f and 15g–15h to a pair of elongated openings provided through pin means 13 regardless of the relative alignment between the openings in pin 13 and the openings 15l and 15m in die 15.

Opening 15b, which is aligned perpendicular to longitudinal axis of die 15, is provided with a keyway portion 15n on one side thereof and has its opposite surface communicating with an axially aligned opening 15p which, in turn, communicates with an axially aligned elongated opening provided in pin 13, as will be more fully described. As can best be seen from FIG. 2c, the upper portion of opening 15b (shown on the left-hand end of FIG. 2c) is of slightly larger diameter as designated by numeral 15q.

FIGS. 3a and 3b are side and end views respectively of the stock shutoff plug 17 which is a solid, substantially cylindrical shaped member having a first end thereof provided with a spherically shaped surface 17a, while the opposite end thereof is provided with a substantially rectangular shaped projection 17b which links with a pair of bifurcated arms provided on coupling stem 18 as will be more fully described. Plug 17 is further provided with a cylindrical shaped opening 17c which permits the passage of stock therethrough and into opening 15p of male die 15 in the following manner:

When plug 17 is rotated to an angular position wherein the longitudinal axis 17d of opening 17c is aligned with longitudinal axis C of FIG. 1c, a portion of the stock entering through the right-hand end of member 11 is diverted so as to enter through both ends of the key-shaped portion 15n of male die 15 and passes through opening 17c so as to enter into opening 15p where it then communicates with the central opening 13b in elongated pin 13 so as to pass through an extruder head in a manner to be more fully described.

By rotating plug member 17 to an angular position whereby the longitudinal axis 17d of opening 17c is aligned perpendicular to the longitudinal axis C of FIG. 1c, any stock entering into key-shaped opening 15n is blocked from being passed through plug opening 17c and into opening 15p due to the misalignment.

If desired, an alternative arrangement may be provided in which the plug may be moved to an intermediate position whereby a portion of opening 17c communicates with key way 15n and axial opening 15p so as to permit the passage of a limited amount of stock therethrough. Thus, if desired, the plug may be altered from its primary use strictly as an on/off control, to use as a means for regulating stock flow therethrough to any amount between the extremes of being completely on and completely off.

Rotation of plug 17 is provided by means of the stem member 18 shown in greater detail in FIG. 4. The stock shutoff stem 18 is provided with a pair of bifurcated arms 18a and 18b which embraces the projection 17b therebetween (Note also FIG. 1b). The bifurcated arms are integrally joined to an elongated rod shaped portion 18c which passes through openings provided in members 11, 19, 20, 21 and 22 so as to be coupled to the rotatable stem arm 22 in a manner to be more fully described. The positive linkage between stem 18 and the arm 22 for rotating the stem is provided by means of a pin which passes through an opening 18d in stem 18 and which further passes through a pair of diametrically aligned openings provided in rotating arm 22, as will be more fully described.

The opening 11d (note FIGS. 1a and 1b) in member 11 receives the left-hand end of a valve stem bushing 20 shown best in FIGS. 7a and 7b. The valve stem bushing is provided with an axially aligned opening 20a having a reduced diameter portion 20b. The cylindrical portion 20c thereof is inserted within opening 11d and reduced diameter portion 20b slidably receives the rod portion 18c of stem 18 which extends throughout the entire axial opening of bushing 20 but makes slidable engagement with only the reduced diameter portion 20b. Cylindrical shaped portion 20c is threaded at 20d so as to threadedly engage opening 11d which is suitably tapped so as to firmly secure valve stem bushing 20 within member 11. The right-hand portion 20e of bushing 20 is of a hexagonal shape, as can clearly be seen from FIG. 7b. A portion 20f of enlarged diameter opening 20a is tapped so as to threadedly engage a threaded portion provided on bushing seal member 21. Bushing seal member 21 is shown best in FIGS. 6a and 6b, and is comprised of a cylindrical shaped portion 21a and a hexagonal shaped portion 21b. The portion 21c of the cylindrical portion of bushing 20 is threaded so as to threadedly engage tapped portion 20f of valve stem bushing 20. The left-hand edge 21d of bushing seal 21 cooperates with a shoulder 20g provided in valve stem bushing 20 (Note FIG. 7a) to embrace a seal ring 19 to be more fully described in connection with FIG. 4d.

FIGS. 9a and 9b are side and end views respectively of the arm 22 for rotating stem 18. The stem rotating arm 22 is comprised of an arm portion 22a having a first opening 22b at its narrower end for receiving the rod shaped portion 23a of the air cylinder pivot clevis 23, to be more fully described. The wider end of arm 22a is provided with an opening 22c which extends through arm portion 22a and circular shaped collar portion 22d. Collar portion 22d is provided with a pair of openings 22e and 22f which are aligned so that their axes are colinear with phantom line 22g (i.e., so that they are diametrically opposite one another). The openings are provided for receiving a fastening pin (not shown) which passes through the opening 18d in stem 18 (See FIG. 4) and openings 22e and 22f to positively link arm 22 to stem 18.

FIGS. 8a and 8b are end and sectional views respectively of the air cylinder pivot clevis 23 which is comprised of a cylindrical shaped portion 23a integrally joined to a hollow cylindrical shaped portion 23b having a smaller diameter opening 23c which is threaded along its length and which communicates with a larger diameter opening 23d. The longitudinal axis 23e of openings 23c and 23d is aligned perpendicular to the longitudinal axis 23f of cylindrical shaped portion 23a. Cylindrical shaped portion 23a extends through opening 22b provided in rotating arm 22 while tapped portion 23c threadedly engages the threaded portion 24a of piston arm 24.

FIG. 1d is a side view, partially sectionalized, showing the components 18–22 respectively. As can be seen, projection 17b in plug 17 is fitted between the bifurcated arms 18a and 18b of stem 18. The rod portion 18c thereof extends through the opening in member 11 (See FIGS. 1a and 1b) and further extends through the central opening provided in member 20. The tapped portion 20f of member 20 threadedly engages the threaded portion 21c of member 21. The left-hand edge 21d of member 21 and the shoulder 20g of member 20 act to embrace a sealing ring 19 therebetween. The right-hand end of the rod portion 18c of stem 18 extends beyond the central opening in member 21 and into the opening 22c provided in rotating arm 22. The opening 18d in stem 18 is aligned with the pair of openings 22e and 22f in rotating arm 22 and a fastening pin is inserted therethrough so as to positively link stem 18 to rotating arm 22.

The air cylinder 26 is provided with an air driven piston (not shown) which is mounted for reciprocal operation within the air cylinder housing so as to move either upwardly or downwardly (relative to FIG. 1b) as shown by arrows D and D' respectively. Suitable openings (not shown) are provided in air cylinder housing for coupling with a suitable source of air pressure for operating the piston upwardly and downwardly to move arm 22 and thereby rotate stem 18 and plug 17 to the on and off positions as was described hereinabove. Although the preferred embodiment described herein utilizes an air cylinder for actuation of the on/off plug member 17, it should be understood that any other suitable actuating mechanism may be employed such as, for example, a relay or any other electromechanical or mechanical device.

It should be noted that no coupling mechanism is provided between plug 17 and stem 18 and that a limited amount of play is provided between these members so as to prevent any misalignment of stem 18 from causing any misalignment or jamming of plug member 17 which is the only member requiring precise alignment. In spite of this play, there is sufficient drive coupling between the members 17 and 18 so as to assure the movement of plug member 17 to the full on and full off positions.

The assembly of FIG. 1d thus acts to provide a means about which the stem 18 and hence the plug 17 may rotate while at the same time providing a seal which prevents the incoming stock from escaping through opening 11d in member 11.

Turning to a consideration of FIGS. 1d, 2a–2c and 5a–5c, it can be seen that the plug 17, when aligned in the manner described hereinabove permits some of the entering stock to be diveretd through keyway 15n, opening 17c in plug 17 and opening 15p in die 15 so as to pass through the elongated axial opening 13b in elongated extrusion pin 13. As was described hereinabove, the left-hand end of pin member 13 relative to FIG. 5a is provided with a threaded portion 13a which threadedly engages the tapped portion 15j provided within the recess of member 15. Adjacent the threaded portion 13a is an annular groove 13c which may be fitted with an O-ring for preventing the egress of air fed through conduits 15f and 15h, as well as preventing the egress of stock therethrough. The annular flange 13d which lies immediately adjacent annular groove 13c fits within the annular shaped recess 15q of member 15.

The elongated axial opening 13b is provided with a slightly enlarged diameter portion 13e at its right-hand end (relative to FIG. 5a) which portion is tapped so as to threadedly engage the threaded portion of an extruder head to be more fully described. The air conduits 15e–15f and 15g–15h of male die 15 respectively communicate with a pair of elongated conduits 13f and 13g provided within elongated pin 13 so as to pass the air under pressure through pin assembly 13 and into the extruder die head coupled thereto for a purpose to be more fully described.

The left-hand ends of conduits 13f and 13g (relative to FIG. 5a) are provided with bevelled portions 13h and 13j for communicating with the annular recess 15k provided at the base of the threaded opening 15j in die 15 which receives the threaded portion 13a of elongated pin assembly 15.

The exterior surface portion 13k of pin 15 is provided with a substantially square shaped configuration to facilitate insertion, tightening and removal of the pin member 13 when it becomes either desirable or necessary to do so.

It can thus be seen that the extruder assembly provides three separate and independent flow conduits namely the axially aligned conduit 13b for the flow of stock to form the skim mentioned hereinabove; the pair of conduits 13f and 13g for the flow of air and the annular shaped hollow region 14 which lies between the exterior surface of pin 13 and the interior surface of extrusion die 12 for the flow of stock therethrough.

The extrusion die head 30 is shown best in the enlarged section of FIG. 1c and is comprised of a threaded narrow diameter portion 30a which threadedly engages the tapped portion 13e of pin 13. Spaced inwardly from portion 30a is a cylindrical shaped portion 30b which diverts the stock flowing out of hollow annular region 14 in the manner shown by arrows 31. The die head 30 is provided with a central opening 30c for passing stock entering opening 30c, through a plurality of openings 30d so as to pass around an adjustable ring 30e and form the skim along the interior peaks of the corrugated tubing being formed. Further elongated openings 30f and 30g are provided in extruder head 30 for communicating with the openings 13f and 13g, respectively, of the elongated pin 13 to couple the air passed therethrough with a plurality of spaced openings 30h to pass the air entering conduits 30g and 30f out of the die head 30 and outwardly toward the corrugated tubing being formed. The flow of air may be regulated by adjusting ring 30k which threadedly engages the threaded surface 30l of the extruder die head to cover more or less of the openings 30h. Ring 30e also is tapped so as to be adjustable to cover more or less of the openings 30d.

As was described in the aforementioned U. S. Pat. No. 3,280,130, the extruder assembly 10 as shown and described in FIGS. 1a–1c is stationary. U.S. Pat. No. 3,280,130 describes the die molds as being made up of die mold halves which are firmly pressed together to form a continuous circular shaped die mold of a corrugated contour. The die mold sections, shown best in FIGS. 1, 2, 3, 7 and 8 of U.S. Pat. No. 3,280,130, are designated by the numerals 41, 41, and more relative to the extruder assembly 10 FIG. 1c of the instant invention in the direction shown by arrow 31 of FIG. 1c. As the die mold halves move past the stationary extruder head assembly 30, the stock exiting from the hollow annular space 14 and designated by the arrows 31 enters into the undulations 32 of the die molds so as to form the corrugated tubing. The air exiting from openings 30d acts to assist the stock flowing about cylindrical shaped member 30b to be firmly urged into the undulations of the die members.

The stock flow which passes through opening 30c exits through openings 30h and flows around ring 30k in the manner shown by arrows 30. This stock flow forms the skim or web 36 along the interior peaks 35a of the corrugated tubing 35 being formed within the die molds. The air conduits 30f and 30g further communicate with openings 30m which serve to keep the corrugated tubing being formed inflated so as to retain its shape after the die mold halves again separate in the manner shown best, for example, in FIG. 1 of aforementioned U. S. Pat. No. 3,280,130. To facilitate this condition, the forward ends of the corrugated tubing being formed is preferably pinched off or, alternatively, a plug means is provided for retaining pressure within the tubing being formed. The air pressure is preferably quite low and is usually of the order of 3 psi.

The Bauman et al. U.S. Pat. No. 3,430,292 describes in detail the manner in which the cuff portions are formed using apparatus of the type described hereinabove as well as that apparatus described in the aforementioned U. S. Pat. No. 3,280,130. This arrangement constitutes the use of sections of die mold halves which have a smooth, cylindrical surface so as to form in immediate sequential fashion the cuff portions for two separate corrugated tube sections (i.e., so as to form the end cuff portion for the last corrugated tubing section which has been formed and so as to form the forward cuff portion for the corrugated tubing section which is about to be formed). Since it is undesirable to form a skim upon the interior surface of these cuff portions, as this will cause a significant deviation in the interior diameter of the cuff portions, the plug means described hereinabove is utilized to terminate the flow of stock during those intervals in which the cuff portions are being formed.

As another obvious alternative, the extruding assembly of the present invention may alternatively be employed to form the corrugated tubing in which it is desired to have no skim simply by operating the piston drive means to maintain indefinite cutoff of the flow of stock otherwise utilized to form the skim layer.

Another embodiment 40 of the present invention which is comprised of a stationary female extrusion die member 41 which is somewhat similar to member 11 of FIGS. 1a–1c. Member 41 is provided with an axial opening 41a for receiving a male die member 42 of substantially cylindrical shape and being comprised of a larger diameter portion 42a and a smaller diameter portion 42b being integrally joined to one another by a tapered portion 42c.

Member 41 is provided with an elongated opening 41b whose central axis 44 is perpendicular to the central axis 42 of opening 41a. An elongated rod-shaped plunger 45 is fitted within opening 44 and is adapted for reciprocal movement therethrough in the manner indicated by double ended arrow 46. Member 41 is provided with a plurality of annular shaped grooves 41c, each of which are fitted with O-rings 47 which provide a sliding seal between plunger 46 and opening 41b to prevent the egress of any stock therethrough.

The right-hand end of member 41 is provided with a pair of arcuate shaped grooves 41c and 41d which together with the narrow diameter portion 42b of member 42 form arcuate shaped openings to permit the passage of stock therethrough in a manner to be more fully described.

As shown best in FIGS. 10c and 10d, plunger 45 is provided with a pair of diagonally aligned slots 45a and 45b. FIG. 10c shows a sectional view of the upper portion of plunger 45 in which slot 45a is shown as being diagonally aligned so as to provide an inlet opening 45d which communicates with the hollow annular space 49 defined by the outer surface of member 42 and the interior surface (i.e. opening 41a) of member 41. An outlet opening 45c is adapted to communicate with the arcuate shaped opening formed by groove 41c and the narrow diameter portion 42b of member 42.

The portion 41e of member 41 surrounding narrow diameter portion 42b of member 42 is joined to the outer portion 41f by webs 41g which divide the otherwise continuous annular shaped hollow region 49 into a plurality of separate arcuate sections 49.

The operation of the flow control apparatus of FIGS. 10a–10d is as follows:

Stock enters from the left through opening 41a and passes through the hollow annular shaped region 49. With the plunger 45 in the dotted line position 45', it can be seen that the openings 45a' and 45b' are displaced from the hollow annular region 49 as well as from the arcuate regions 41c and 41d so as to prevent the passage of any stock flow therethrough. This constitutes the cutoff position for stock flow through the outlets 41c and 41d.

By moving plunger 45 downwardly into the solid line position, openings 45a and 45b communicate on the left with annular opening 49 and on the right with arcuate shaped openings 41c and 41d so as to permit some of ths stock entering into annular shaped region 49 to be diverted through the openings 45a and 45b and plunger 45 and thereby enabling the stock to pass through openings 41c and 41d.

Whereas plunger 45 does block portions of the annular shaped opening 49, it can clearly be seen that the stock flow is otherwise unimpeded as it is permitted to pass around each of the plunger portions impeding flow (in the regions A and B shown in FIG. 9b). After passing around plunger 45 and outwardly through member 41, the stock flow becomes substantially continuous and uniform and passes through an annular shaped opening substantially equivalent to the annular shaped hollow region 14 as shown and described in conjunction with FIG. 1c.

It should further be noted that member 42 is also provided with a pair of annular shaped grooves 42d and 42e for receiving O-rings 50 and 51 respectively, which provide a sliding seal to prevent the passage of stock therethrough.

Plunger 45 may be operated by an air cylinder of the type described in conjunction with FIGS. 1a–1c or any other suitable mechanical or electromechanical device. The apparatus of FIGS. 10a–10d may be utilized with an assembly of the type shown in FIGS. 1a–1c which is accordingly modified so as to communicate with the stock flow openings provided in the embodiment of FIGS. 10a and 10b. Member 42 may be provided with elongated openings 42f and 42g to provide air conduits which serve in a fashion similar to those described in conjunction with the embodiment of FIGS. 1a–1c to perform the functions described hereinabove.

It can be seen from the foregoing that the present invention provides a novel stock flow control means for use in extruders and the like in which separate stock flow conduits are provided to yield a continuous stock flow conduit and an intermittent stock flow conduit which may be utilized to open or close the intermittent stock flow conduit in a rapid and positive manner and which is especially advantageous for use in forming the skim layer in corrugated tubing as was described hereinabove. The stock flow control means utilizes a plunger member whose accurate positioning is maintained by providing a loose fitting actuating stem member which introduces sufficient play between the stem and plug members so as to prevent any misalignment or jamming of the plug member during continuous thereof.

In the foregoing this invention has been described in conjunction with preferred embodiments. Many modifications will now become apparent to those skilled in the art and it is preferred, therefore, that the instant invention be limited not by the foregoing disclosure but only by the appending claims.

What is claimed is:

1. Flow control means for extruders and the like comprising:
    a first hollow die member;
    a second annular shaped die member positioned within said first die member and forming a hollow annular region defined by the interior surface of said first member and the exterior surface of said second member;
    means for feeding stock at a first end of said first and second members into said hollow annular region to exit at the second end thereof;
    said first and second members each having coaxial openings whereby the common axis of said coaxial openings is transverse to said hollow annular shaped opening;
    the opening in said first member having an elongated groove along the surface of said opening and having at least one end thereof communicating with said hollow annular shaped region;
    said second die member having an axial conduit coupling the opening in said second die member with the second end of said second die member;
    rotatable plug means mounted within the opening in said second die member and having an opening aligned transverse to the axis of rotation of said plug means;
    control means extending into said coaxial openings and coupled to plug means for rotating said plug means between a first position wherein said plug opening establishes a stock flow path for stock entering said groove through said plug opening and into said axial conduit and a second position whereby said plug opening is offset from said axial conduit and said groove to prevent the flow of stock into said axial conduit.

2. The apparatus of claim 1 wherein said control means comprises a rotatable stem member coupled to one end of said plug means whereby sufficient play is provided between said stem member and said plug means to provide free movement of said plug means between said first and second positions while preventing axis-alignment or jamming of said plug means.

3. The apparatus of claim 2 wherein the end of said plug means is provided with a pair of spaced substantially parallel faces;
    said stem member having a pair of bifurcated arms loosely embracing said parallel faces to impart rotational movement to said plug means.

4. The apparatus of claim 1 wherein said second die member is provided with a second conduit extending between the first and second ends of said second die member;
    means for feeding air under pressure into the first end of said second conduit means;
    said second conduit means being completely isolated from the coaxial opening provided in said second die member.

5. The apparatus of claim 4 wherein said second conduit comprises a pair of conduits joined at the first end of said second die member extending around and isolated from said coaxial opening and terminating in separate openings provided at the second end of said second die member.

6. The apparatus of claim 1 wherein said control means includes air cylinder means having a piston rod; a coupling arm coupled between said piston rod and said stem member for converting the linear movement of said piston rod into rotational movement for rotating said plug means.

7. The apparatus of claim 6 further comprising bearing means providing a sealed bearing assembly for said stem mbmer while preventing the escape of stock from said first and second member coaxial opening.

8. Flow control means for extruders and the like comprising:
    a first hollow die member;
    a second annular shaped die member positioned within said first die member and forming a hollow annular region defined by the interior surface of said first member and the exterior surface of said second member;
    means for feeding stock at a first end of said first and second members into said hollow annular region to exit at the second end thereof;
    said first and second members each having coaxial openings whereby the common axis of said coaxial openings is transverse to said hollow annular shaped opening;
    rod shaped means mounted within said opening;
    second conduit menas communicating between one of said coaxial openings and the second ends of said first and second die members;
    at least one opening in said rod means;
    means for moving said rod means between a first position for diverting stock passing through said hollow annular region through said opening in said rod means and into said conduit means and a second position whereby said rod means opening is displaced from said hollow annular region and said conduit to prevent the flow of stock into said conduit.

9. The apparatus of claim 8 wherein said rod is mounted for reciprocating movement between said first and second positions.

10. The apparatus of claim 8 wherein said rod is mounted for rotational movement between said first and second positions.

* * * * *